United States Patent [19]

Heerwegh et al.

[11] Patent Number: 5,530,347
[45] Date of Patent: Jun. 25, 1996

[54] INDUCTION-BASED SEMI-AUTOMATIC DEVICE AND METHOD FOR READING COORDINATES OF OBJECTS WITH A COMPLICATED STRUCTURE AND INPUTTING DATA THEREON INTO A COMPUTER

[75] Inventors: André A. M. Heerwegh, Schilde, Belgium; Eduard N. Leonovich, Str. Slavinskogo 17-268, 220049 Byelarus, Minsk, Belarus

[73] Assignees: Andre A. M. Heerwegh, Schilde, Belgium; Igor V. Tereshko, Minsk, Belarus; Adrianus M. van Lith, GaRosmaien, Netherlands; Eduard N. Leonovich, Minsk, Belarus

[21] Appl. No.: 367,186

[22] PCT Filed: Jun. 23, 1993

[86] PCT No.: PCT/BE93/00039

§ 371 Date: Dec. 23, 1994

§ 102(e) Date: Dec. 23, 1994

[87] PCT Pub. No.: WO94/00826

PCT Pub. Date: Jan. 6, 1994

[30] Foreign Application Priority Data

Jun. 24, 1992 [BE] Belgium ............................ 09200588

[51] Int. Cl.⁶ .......................... G01B 7/004; G06K 11/16; G08C 21/00; G01R 33/02
[52] U.S. Cl. ...................... 324/207.17; 178/18; 324/247; 364/559; 364/731; 345/158
[58] Field of Search ..................... 324/207.17, 207.18, 324/207.19, 207.26, 232, 243, 247; 178/18, 19; 340/686, 870.32; 364/559, 561, 731, 815; 345/158; 395/119

[56] References Cited

U.S. PATENT DOCUMENTS

| | | | |
|---|---|---|---|
| 4,396,885 | 8/1983 | Constant | 324/207.18 |
| 4,688,037 | 8/1987 | Krieg | 324/247 X |
| 4,812,812 | 3/1989 | Flowerdew et al. | 324/247 x |
| 4,829,250 | 5/1989 | Rotier | 324/247 X |
| 5,168,222 | 12/1992 | Volsin et al. | 324/247 X |

*Primary Examiner*—Gerard R. Strecker
*Attorney, Agent, or Firm*—Bacon & Thomas

[57] ABSTRACT

A device and method for reading three-dimensional information involves generating a variable magnetic field in a Cartesian coordinate system and coaxially placing first and second magnetometric sensors made up of three bi-orthogonal receiver induction coils each such that a point on the device, hereinafter referred to as a peak point, is superposed on a point having unknown coordinates. The unknown coordinates are identified based on a generalized information signal $E_\Sigma = e_1^2 + e_2^3 + e_3^2$, where $e_i (i=1, 2, 3)$ is the amplitude of signals induced in the three bi-orthogonal receiver induction coils in each of the magnetometric sensors. The magnetic induction vectors of the generated magnetic field are rotated around a zero point of the coordinate system, after which the maximum value of an amplitude of the generalized information signal and corresponding maximum turning angles of the magnetic induction vectors in respective horizontal and vertical planes are registered, and the coordinates of points in the sensors defined in relation to the coils are determined in order to derive the coordinates of the peak point.

4 Claims, 5 Drawing Sheets

INDUCTION-BASED SEMI-AUTOMATIC DEVICE AND METHOD FOR READING COORDINATES OF OBJECTS WITH A COMPLICATED STRUCTURE AND INPUTTING DATA THEREON INTO A COMPUTER

BACKGROUND OF THE INVENTION

1. Field of the Invention

The present invention concerns the field of automation and computer engineering. It concerns in particular an inductional, semi-automatic method for reading the coordinates of three-dimensional objects (scale models, models) with a complicated structure and the input of these data in a computer.

The invention can also be used without any restrictions whatsoever for reading the coordinates of two-dimensional objects (such as drawings, diagrams, maps, etc. ) and for their input in a computer.

2. Description of Related Art

Electromechanical methods are already known for the semi-automatic reading of the information of three-dimensional objects. Such a method is described in the Japanese patent application No 1-94420 for a "computer-oriented reading device for three-dimensional information"; IZOBRETENIA STRAN MIRA 1990, N6, p. 78. The method is based on the use of the three-dimensional pantographical system, whereby use is made of three three-dimensionally moveable levers which are connected to a stationary support and the actual coordinate reading device.

The levers are connected to one another by means of sensors which measure the angular displacement, whose information, taking into account the (known) length of the lever arms, can be used as basic data for the calculation (identification) of the three-dimensional coordinates of a specific point (peak point) of the coordinate reading device, which was superposed by the operator on a point of the object to be measured.

This method is disadvantageous in that it is inaccurate, due to the presence of several sensors which measure the angular displacements (sensors of the "angle-code" type), and the large dimensions of the lever arms which make it difficult to meet the demands of mechanical rigidity, and finally the limited functional possibilities of such devices, due to the mass inertia of the system and the impossibility to measure the complicated inner faces of objects.

The present invention more closely resembles methods based on the use of induction to permit semi-automatic reading of surface and three-dimensional coordinates, such as the method described in the USSR author's certificate No. 550 548 for: "Device for reading graphic information" (BULLETEN IZOBRETENII N 10). This method involves the generation of a variable magnetic field at two points on a coordinate axis which is part of the three-dimensional coordinate system realized with a certain increase in the digitization of the working space; the creation, by means of two magnetometric sensors which are placed along the axis in the coordinate reading device, of the generalized information signal $E_\Sigma = e_1^2 + e_2^2 + e_3^2$ whereby $e_i$ is the amplitude of the signals which are induced in three (i=1, 2, 3) bi-orthogonal receiver induction coils in each of the magnetometric sensors; a formation of the sequence of digital values of the output signals of the sensors; the identification of the coordinates of the common center of the three bi-orthogonal coils which make up each sensor, referred hereinafter as the sensor "middle points," as the extreme points for the generalized information signals of all value sequences of the coordinate axis; and the calculation of the peak point of the coordinate reading device, placed on the point of the object whose coordinates are being read, according to the following equation:

$$u = u_2 - a/b \, (u_1 - u_2),$$

whereby $u = \{x, y, z\}$ and a and b are constants which define the design of the coordinate reading device (a—is the distance between the peak point and the middle point of the nearest magnetometric sensor, b—is the distance between the middle points of the sensors).

The disadvantage of this known method is again its inaccuracy due to mechanical limitations resulting from placement of the coordinate induction coils at 1–2 mm steps to generate the variable magnetic field at specific points in the coordinate system.

SUMMARY OF THE INVENTION

The present invention aims to make the inductive reading of three-dimensional coordinates as accurate as possible by restricting the number of excitations of the coordinate induction coils in the magnetic field, as well as by restricting the functional changes in the exciter current for said induction coils as much as possible.

This aim is reached by means of a method for reading three-dimensional information, including the generation of a variable magnetic field at points which are part of the coordinate system of the working space, the formation, by means of two magnetic sensors which are placed coaxially in the device which reads the coordinates for the generalized information signal $E_{93} = e_1^2 + e_2^2 + e_3^2$, in which $e_i$ is the amplitude of the signals (i=1, 2, 3) which are induced in three bi-orthogonal receiver induction coils in each of the magnetometric sensors, the determination of the coordinates of the peak point $u = \{x, y, z\}$ of the coordinate reading device being made according to the following equation:

$$u = u_2 - a/b \, (u_1 - u_2),$$

whereby $u_1 = \{x_1, y_1, z_1\}$ and $u_2 = \{x_2, y_2, z_2\}$ are the coordinates of the middle points of the first and second magnetometric sensors respectively, a—is the distance from the peak point of the coordinate reading device to the middle point of the nearest magnetometric sensor and b—is the distance between the middle points of the sensors, characterized in that the magnetic induction vector of the generated field is rotated around the zero point of the coordinate system of the working space, in that the maximum amplitude values $E_{\Sigma max}$ of the generalized information signal of the first and second magnetometric sensors and the corresponding maximum turning angles $\alpha_1$, $\beta_1$ and $\alpha_2$, $\beta_2$ of the magnetic induction vectors of the field are registered in the horizontal and vertical planes respectively; in that the coordinates of the middle points of each of the magnetometric sensors are determined according to the following equations:

$$x = R \cos \alpha \sin \beta,$$

$$y = R \sin \alpha \sin \beta,$$

$$z = R \cos \beta,$$

whereby $R=f(E_{\Sigma max})$ has a predefined value and on the basis of the result of which the coordinates of the peak point of the coordinate reading device are identified.

The aim is also reached according to the new method by rotating the magnetic induction vector in the generated field successively about two points which are situated at a fixed distance d from one another on one of the coordinate axes (for example OX) in the Cartesian coordinate system for the working space, and in the horizontal and vertical planes; by differentiating the information signal for both magnetometric sensors according to the turning angle, as well as for the two field rotation points and each of the rotation planes. As soon as the amplitude of the differentiated signals equals zero, the corresponding angles of rotation of the induction vector of the magnetic field $\alpha_1^{(1)}, \alpha_2^{(1)}$ and $\beta_1^{(1)}, \beta_2^{(1)}; \alpha_1^{(2)}, \alpha_2^{(2)}$ and $\beta_1^{(2)}, \beta_2^{(2)}$, which characterize the rotation of the magnetic induction vector are registered and the Cartesian coordinates $x_k, y_k, z_k$, (k=1, 2) of the middle points of the magnetometric sensors are defined by the following equations:

$$x_k = d \frac{\tang \cdot \alpha_2^{(k)}}{\tang \cdot \alpha_1^{(k)} + \tang \cdot \alpha_2^{(k)}}$$

$$y_k = d \frac{\tang \cdot \alpha_2^{(k)} \tang \cdot \alpha_2^{(k)}}{\tang \cdot \alpha_1^{(k)} + \tang \cdot \alpha_2^{(k)}}$$

$$z_k = d \frac{\tang \cdot \alpha_2^{(k)} \cdot \cos\alpha_2^{(k)} \cdot \cotg \cdot \beta_1^{(k)}}{\tang \cdot \alpha_1^{(k)} + \tang \cdot \alpha_2^{(k)}}$$

On the basis of the solution, the coordinates of the peak point of the coordinate reading device are defined.

The invention also concerns a device for reading three-dimensional information which is particularly suited for the above-described embodiments of the method.

Thus, the invention concerns a device for reading three-dimensional information, which contains means for generating a variable magnetic field in the working space, a reading device which contains two coaxially placed magnetometric sensors each having three bi-orthogonal receiver induction coils and a peak point to be superposed on a point (M) to be read with unknown coordinates and means to determine the coordinates of the peak point on the basis of the information signal $E_{93} = e_1^2 + e_2^2 + e_3^2$ whereby $e_i$ is the amplitude of the signals which are induced in the three receiver coils (i=1, 2, 3) of a sensor, characterized in that it contains means to rotate the magnetic induction vector of the generated magnetic field in the working space around the zero point 0 of the coordinate system, means to register the maximum value of the amplitude $E_{93, max}$ of the generalized information signal of the sensors and the corresponding maximum turning angles $\alpha_1, \beta_1$ and $\alpha_2, \beta_2$ of the magnetic induction vectors in the horizontal and vertical planes respectively, means to determine the coordinates of the middle points of each of the sensors and means to define the coordinates of the coordinate reading device on the basis thereof or characterized in that it contains means to rotate the magnetic induction vector of the magnetic field successively about two points situated at a fixed mutual distance d on one of the coordinate axes of the coordinate system of the working space, and in the horizontal and vertical planes, means to differentiate for each of the rotation points and for each of the two rotation planes the generalized information signal of each of the sensors according to the turning angle, means to register, as soon as the amplitude of the differentiated signals equals zero, the corresponding angles $\alpha_1^{(1)}, \alpha_2^{(1)}$ and $\beta_1^{(1)}, \beta_2^{(1)}; \alpha_1^{(2)}, \alpha_2^{(2)}$ and $\beta_1^{(2)}, \beta_2^{(2)}$ which characterize the rotation of the induction vector, means to define the Cartesian coordinates $x_k, y_k, z_k$, (k=1, 2) of the middle points of the sensors and means to determine on the basis thereof the coordinates of the peak point of the coordinate reading device,

BRIEF DESCRIPTION OF THE DRAWINGS

Other particularities and advantages of the invention will become clear from the following description of a method and device for reading three-dimensional information, according to the invention. This description is given as an example only and does not limit the invention in any way. The figures refer to the accompanying drawings where.

DETAILED DESCRIPTION OF THE PREFERRED EMBODIMENTS

Figure 1:
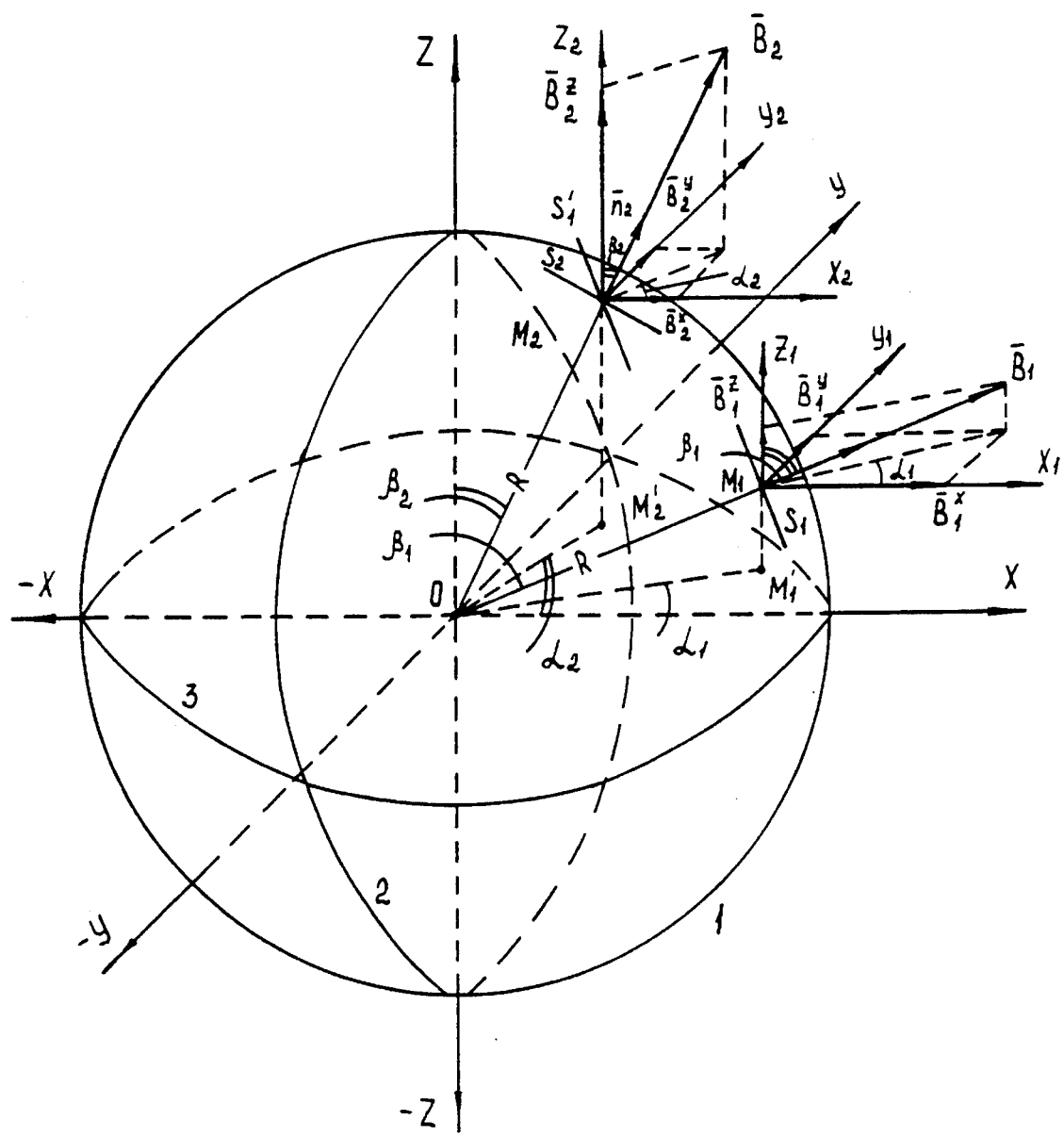
FIG. 1 schematically represents the rotation of the magnetic induction vector in the working space.

The method of the invention works because, if a source of an electromagnetic field is situated at the zero point 0 (FIG. 1) of the Cartesian coordinate system such that the components of the magnetic coordinate axis are changed according to the following equation:

$\overline{B}_x = B \cos \alpha \sin \beta$, $\overline{B}_y = B \sin \alpha \sin \beta$, $\overline{B}_z = B \cos \beta$, (1)

(whereby $\alpha, \beta$ are the angles between the magnetic induction vector $\overline{B}$ of the field and the positive direction of the coordinate axes OX and OZ respectively), with respectively altered angle values in the field $0 \leq \alpha, \beta \leq \pi/2$ in each point of the surrounding space, then a magnetic field is generated whose vector $\overline{B}$ rotates around the starting point and whose magnitude B is constant for the coordinates of the points at an equal distance from the zero point. If we examine two random points $M_1$ and $M_2$, which are situated on the surface of the sphere having a radius R, and if we work out the above-mentioned equation (1) for the lengths of the vectors $\overline{B}_1$ and $\overline{B}_2$, the following uniform equations are the outcome:

$$|\bar{B}_{1,2}| = \sqrt{B_x^2 + B_y^2 + B_z^2} = \sqrt{(B\cos\alpha\sin\beta)^2 + (B\sin\alpha\sin\beta)^2 + (B\cos\beta)^2}$$

$$= \sqrt{B^2\sin^2\beta(\cos^2\alpha + \sin^2\alpha) + \beta^2\cos^2\beta} = \sqrt{B^2\sin^2\beta + B^2\cos^2\beta} = B$$

It is clear that, if all conditions of the equation (1) are met, the direction of the vectors $\bar{B}_1$ and $\bar{B}_2$ coincides with the direction of the points $M_1$ and $M_2$ which are oriented towards the starting point 0. When the identification sensors for the magnetometric position (the magnetometric sensors activate the three bi-orthogonal induction coils with the same radius r around the general middle point of each sensor) are superposed on the points $M_1$ and $M_2$, each amplitude of the induced generalized information signal, formulated as $E_\Sigma = e_1^2 + e_2^2 + e_3^2$, whereby $e_i$ is the amplitude of the signals which are induced in the three receiver induction coils (i=1, 2, 3), no longer depends on the three-dimensional orientation of each sensor, but reflects the strength of the magnetic field in the middle point of the sensor, i.e. at least the distance between the middle point of the sensor and the source of the magnetic field. The influence which the magnetic induction vector $\bar{B}$ exerts on the field (at point $M_1$ this is vector $\bar{B}_1$ and at point $M_2$ this is vector $\bar{B}_2$) of the magnetometric sensor is equal to its influence on any of the receiver induction coils, of which the S plane remains constantly perpendicular to the magnetic induction vector $\bar{B}$, or, which comes down to the same, the perpendicular vector $\bar{n}$ ($\bar{n}_1$ in the point $M_1$ and $\bar{n}_2$ in the point $M_2$) coincides with vector $\bar{B}$.

In the graphical example which is discussed, the equivalent positions of the induction coils in the points $M_1$ and $M_2$ will be equal to the positions $S_1$ and $S_2$. It is appropriate to say that, during the rotation of the magnetic induction vector as the angles $\alpha$ and $\beta$ change from 0 degrees to 90 degrees, the amplitude of the induced generalized information signal reaches its maximum value when the middle point of the magnetometric sensor is situated at the point having polar coordinates which correspond to the angles $\alpha$ and $\beta$. If the middle point of the first magnetometric sensor is superposed for example on point $M_1$, whose position is indicated by the length of the radius vector R and the value of the angles $\alpha$ and $\beta$, the total flux $\Phi$ of the magnetic induction vector $\bar{B}_1$, whose length $B_1$, as described above, equals the length B of vector $\bar{B}$, defined by the following equation:

$$\Phi_1 = B\,S_1\cos\gamma$$

whereby $\gamma$ is the angle between the perpendicular $\bar{n}_1$, drawn on the S plane, and the vector $\bar{B}_1$. In our case, the angle $\gamma$ in FIG. 1 equals zero (since the orientation of $\bar{n}_1$ and $\bar{B}_1$ coincides). For the point $M_1$ this results in:

$$\Phi_1 = B\,S_1$$

If the middle point of the second magnetometric sensor is superposed on point $M_2$, the starting point of the coordinates with the same mutual distance R, the outcome for the flux $\Phi_2$, under the conditions of the magnetic field, defined by the angles $\alpha_1$ and $\beta_1$, and according to the equivalent position of the induction coil $S'_1$, is a value which is lower than for the flux $\Phi_1$, since the positions of the plane $S'_1$ and the vector $\bar{B}_2$, as represented in FIG. 1, form an angle which differs from the angle of 90 degrees. The perpendicular $\bar{n}_2$ which is drawn on the plane $S'_1$ (not represented in FIG. 1 for clarity's sake) does not coincide with vector $\bar{B}_2$, and moreover the angle $\gamma$ is bigger than 0.

That is why the flux $\Phi_2$ can be defined as:

$$\Phi_2 = B\,S'_1\cos\gamma < B\,S_1 = \Phi_1$$

Thus, the application of the rotating magnetic field, which generates an equal field strength H at the points of the working space which are situated at an equal distance from the middle point of the turning movement, together with the use of two magnetometric sensors, whereby the amplitude of the generalized information signal remains unchanged in relation to their three-dimensional direction, form the basis of the method for reading three-dimensional information.

That is why fixed values are accorded in a specific order to $\beta_1$ selected with an interval $0-\pi/2$, at an increment $\Delta\beta$, and for each $\beta_i$ the angle $\alpha$ is subsequently changed according to the selected increment $\Delta\beta$, and the order of the amplitudes $E_{\Sigma,i,j}$ (whereby j—is an index for the angle $\alpha$) of the generalized information signal defined for each of the two magnetometric sensors of the coordinate reading device. During the rotation of the magnetic field, according to the corresponding increments $\Delta\beta$ and $\Delta\alpha$, the amplitudes of the induced generalized signals are compared one by one, and for each of the sensors the maximum amplitude values are defined and registered as values $E_{\Sigma,max}$ together with the corresponding angle values $\alpha_1$, $\beta_1$ and $\alpha_2$, $\beta_2$.

The maximum value of the amplitude provides an idea of the magnitude R of the radius vector of each middle point of the sensor, and the values $\alpha_1$, $\beta_1$ and $\alpha_2$, $\beta_2$ can help to define the position of the middle points on the OX and OY axes respectively in the Cartesian coordinate system, whose zero point 0 is superposed on the middle point 0 of the rotation. By making use of known equations for the conversion of the polar coordinates to the Cartesian ones $$x = R\sin\beta\cos\alpha$$

$$y = R\sin\beta\sin\alpha$$

$$z = R\cos\beta \qquad (3)$$

the middle points with coordinates $x_1$, $y_1$, $z_1$ and $x_2$, $y_2$, $z_2$ of the first and second magnetometric sensors can be determined.

Since the sensors in the coordinate reading device are placed coaxially on the peak point (see FIG. 2) it is easy to show that the coordinates x, y and z of the peak point, which is superposed on the reading point M of the three-dimensional object, are defined by the equation:

$$u = u_2 - a/b\,(u_1 - u_2)$$

or with:

$$u = x,\ y\ \text{and}\ z:$$

$$x = x_2 - a/b\,(x_1 - x_2)$$

$$y = y_2 - a/b\,(y_1 - y_2)$$

$$z = z_2 - a/b\,(z_1 - z_2) \qquad (4)$$

(whereby a is the distance from the peak point to the middle point of the nearest sensor and b is the distance between the middle points of the sensors).

Figure 2:
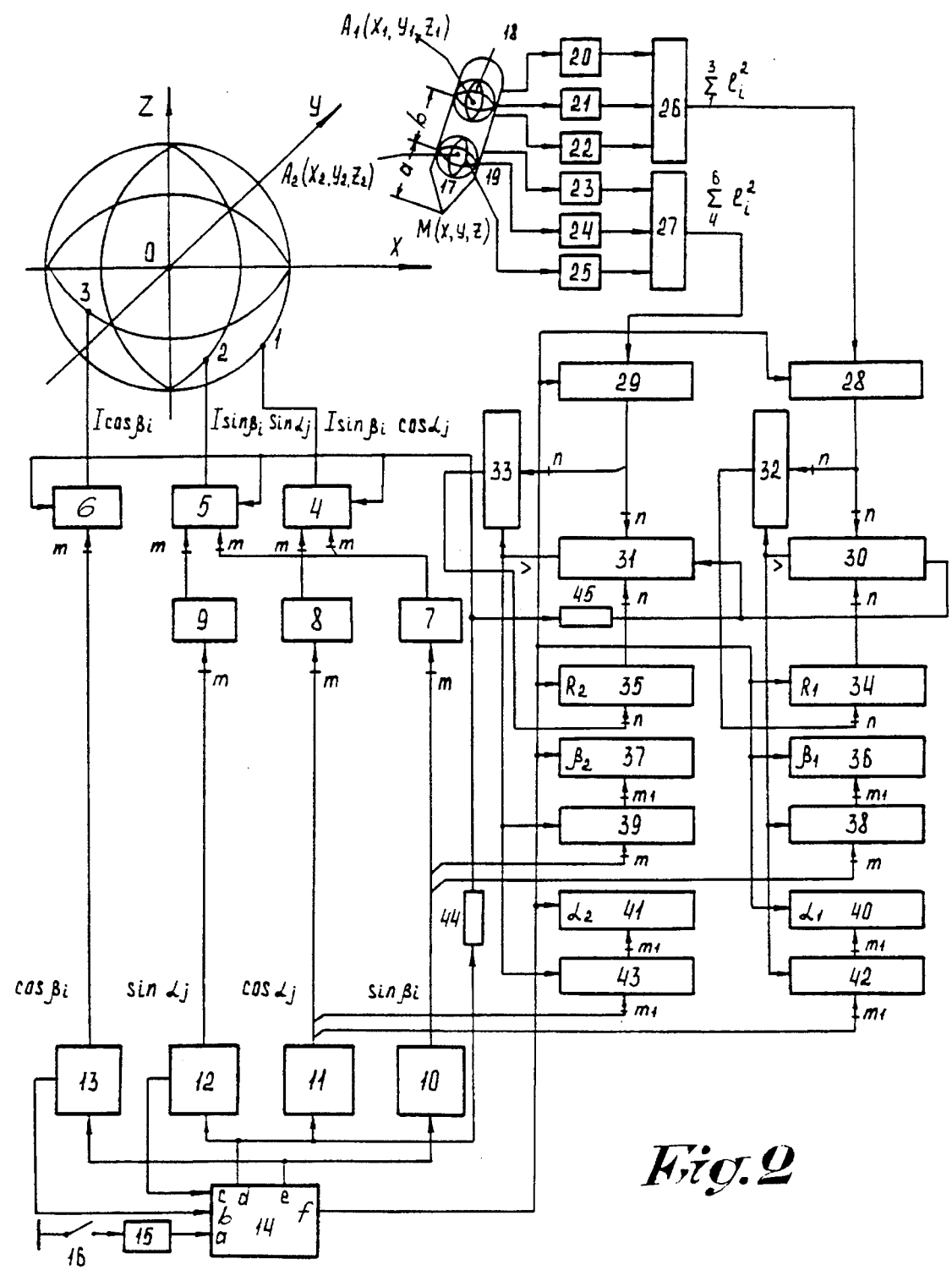
FIG. 2 is a schematic representation of a device for reading three-dimensional information according to the invention.

FIG. 2 is a schematic representation of a first embodiment of a device with which the method can be applied. The rotated electromagnetic field is formed by means of identical induction coils 1, 2 and 3 which are placed bi-orthogonally in the XOZ, YOZ and XOY planes of the Cartesian coordinate system. The general middle point of the induction coils 1, 2 and 3 is superposed on the starting point 0 of the coordinate system. The coils are simultaneously excited by current pulses whose variable amplitudes can be described as $$I_1 = I \sin \beta \cos \alpha$$

$$I_2 = I \sin \beta \sin \alpha$$

$$I_3 = I \cos \beta$$

The device contains three current pulse generators 4, 5 and 6 to excite the current pulses $I_1$, $I_2$ and $I_3$ respectively, memory units 7, 8, and 9 to store values of functions $\sin \beta$, $\cos \alpha$ and $\sin \alpha$, and four memory units 10, 11, 12 and 13 to store the values of the functions $\sin \beta$, $\cos \alpha$, $\sin \alpha$ and $\cos \beta$ in correspondence with the selected increments $\Delta \alpha$ and $\Delta \beta$ connected respectively to memory units 7, 8, and 9 and pulse generator 6, memory units 7, 8, and 9, with memory units 8 and 9 being respectively connected to pulse generators 4 and 5 and memory unit 7 being connected to both pulse generator 4 and pulse generator 5, such that the respective pulse generators 4, 5, and 6 output pulses corresponding to $I \sin \beta_i \cos \alpha_j$, $I \sin \beta_i$, $\sin \alpha_j$, and $I \cos \beta_i$.

The memory units 11 and 12 are connected to the control output "d", and the units 10 and 13 to the control output "e" of the control unit 14, which is connected via its input "a" to the solo pulse generator 15, which is connected to the start button 16. The device contains the actual coordinate reading device 17 which has a peak point as defined above and two magnetometric sensors 18 and 19 which each contain three receiver induction coils. The outputs of the three coils of the sensor 18 are sent via the amplifiers/multipliers 20, 21 and 22 to the analog accumulator 26, whereas the outputs of the three coils of the sensor 19 are sent via the amplifiers/multipliers 23, 24 and 25 to the analog accumulator 27. The amplifier/multipliers 20 to 25 work according to the square root multiplication principle. The analog accumulators 26 and 27 are connected to the analog-digital converters (ADC) 28 and 29 respectively, whose output is connected to the corresponding comparators 30, 31 and the code transmission gates 32 and 33, whose data outputs are connected to the inputs of the flipflop registers 34 and 35 which are used to store the respective codes of the lengths of each middle point of the sensor of the radius vectors $R_1$ and $R_2$. The outputs of the above-mentioned comparators 30 and 31 are connected to the control inputs of the code transmission gates 32 and 33. Further, the device also contains the flipflop registers 36 and 37 which store the angle values $\beta_1$ and $\beta_2$, illustrated in FIG. 4 and which, by means of their data inputs, are connected to the code transmission gates 38 and 39, whose data inputs are connected to the output of the corresponding comparators 30 and 31 and to the output of the memory unit 10, used to store the function value $\sin \beta$.

Figure 4:
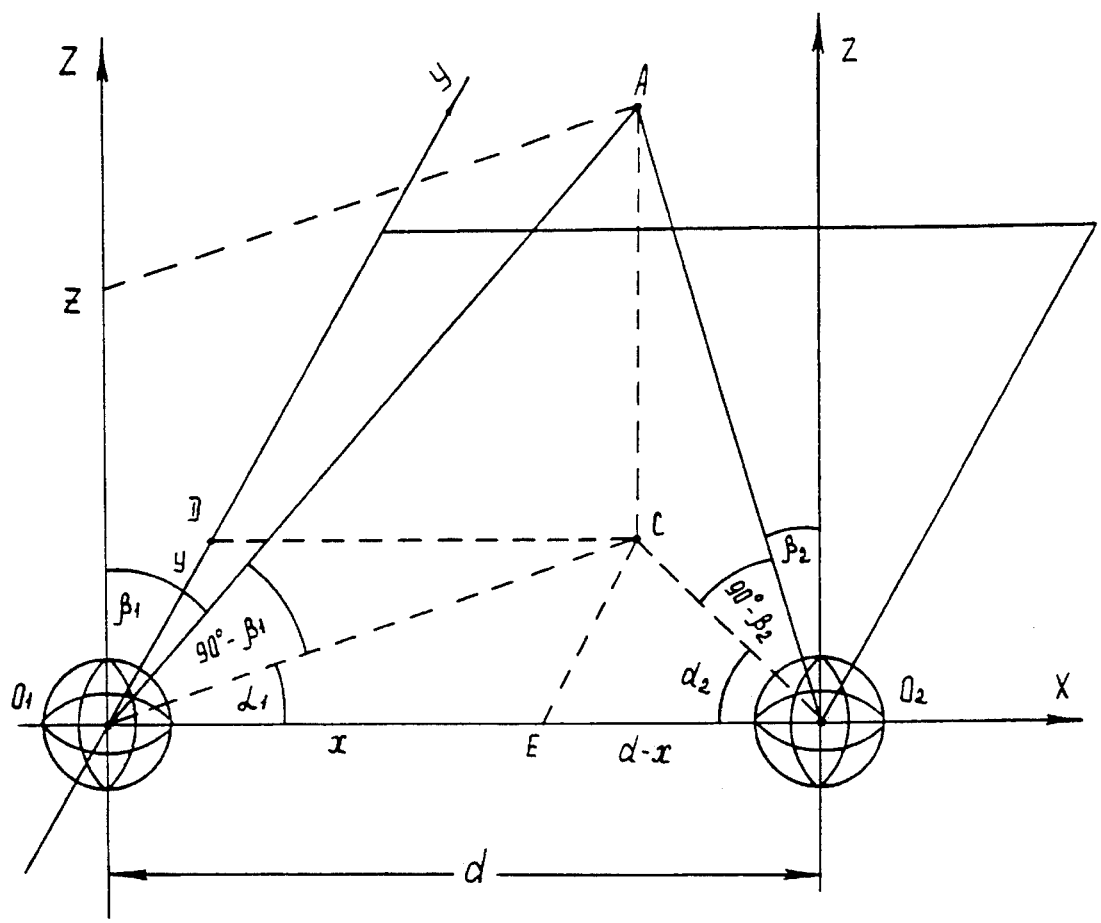
FIG. 4 schematically represents the identification of the Cartesian coordinates of the middle points of the magnetometric sensor.

The device contains flipflop registers 40 and 41 to store the values for the angles $\alpha_1$ and $\alpha_2$, as illustrated in FIG. 4 and which have analogous connections with the code transmission gates 42 and 43, the comparators 30 and 31 and a memory unit 11, used for storing the $\cos \alpha$ function value.

The control unit 14 is connected via its output "f" to the inputs of the original settings of the analog-digital convertors 28 and 29 and the flipflop registers 34, 35, 36, 37, 40 and 41, via its output "d" and first delay element 44 with the control inputs of the current pulse generators 4, 5 and 6 and via the second delay element 45 to the control inputs of the comparators 30 and 31. The input "b" of the control unit 14 is connected to the output of the cycle completion in the memory unit 13, meant to store the $\cos \beta$-values, and the input "c" is connected to the analogous output of the memory unit 12, used for storing the function $\sin \alpha$-values.

The device works as follows. When the specific point on the coordinate reading device 17 superposed by the operator on a point of the object to be measured, referred to herein as the peak point, is placed on the output point M (x, y, z) of the three-dimensional object, the operator closes the loop by pushing the start button 16, as a result of which the pulse generator 15 is activated and sends a start pulse to the control unit 14, which is a digitized circuit.

Upon receival of the start pulse the control unit 14 emits the output signal for the initial setting (zero) for the flipflops (AD convertors 28 and 29 for the registers 34, 35, 36, 37, 40 and 41) via its output "f". Afterwards, the control unit 14 sends values of the functions $\sin \beta_0$ and $\cos \beta_0$ respectively via its output "e" and respective memory units 10 and 13 to the register 7 and the I$\cos \beta$ current pulse generator 6. Afterwards, the control unit 14 sends pulses via its output "d" which successively send the values of the functions $\cos \alpha$ and $\sin \alpha$ from the memory units 11 and 12 to the registers 8 and 9. At that moment, the multiplications are worked out in the pulse generators 4 and 5, which results in the $\sin \beta_0 \cos \alpha$ and $\sin \beta_0 \sin \alpha$ products. The signal which is emitted via the same output "d" and which is delayed by the delay element 44, simultaneously sends amplitude signals $I_1 = I \sin \beta_0 \cos \alpha$, $I_2 = I \sin \beta_0 \sin \alpha$ and $I_3 = I \cos \beta_0$ through the current pulse generators 4, 5 and 6 to the corresponding induction coils 1, 2 and 3. When the alternating current flows through the coils 1, 2 and 3, the current pulses induced in the induction/magnetometric sensors 18 and 19 are amplified (when there have been two multiplications) by the amplifier/multipliers 20–25, added up three by three in the analog accumulators 26 and 27 and converted to digital code values by A/D convertors 28 and 29. When the amplitudes of the signals of the generalized data of the magnetometric sensors 18 and 19 are converted in a code, the signal of the output "d" of the control unit 14 which is transmitted through the delay elements 44 and 45 is supplied to the control input of the comparators 30 and 31 which compare the current codes on the outputs of the A/D convertors 28 and 29 to the current codes in registers 34 and 35 used for storing the data on the $R_1$ and $R_2$ lengths of the radius vectors.

If the current code values at any outputs of the A/D convertors 28 and 29 are higher than those of the codes stored in the registers 34 and 35 (whose initial setting is zero) the codes of the outputs of the A/D convertors are transmitted via the corresponding code transmission gates 32 and 33 to the registers 34 and 35, as a result of which the previously stored values are changed. Simultaneously, the signals output by the comparators 30 and 31 trigger gates 38, 39, 42, and 43 to cause the codes for the angles $\beta_1$ and $\alpha_1$ to be respectively transmitted from the memory units 10 and 11 to the registers 36 and 40 via the code transmission gates 38 and 42 (for the first magnetometric sensor 18) and the codes for the angles $\beta_2$ and $\alpha_2$ to be respectively transmitted from the memory units 10 and 11 to the registers 37 and 41 via the code transmission gates 39 and 43 (for the second magnetometric sensor 19).

During the scanning of the working space under angle $\alpha$ and on condition that $\beta_0$ is fixed, the registers 35, 37 and 41 receive the code of the maximum radius vector value for the middle point $A_1$ of the first magnetometric sensor 18 and in accordance with the maximum angles $\beta_1$ and $\alpha_1$. Analogous codes are stored in the registers 35, 37 and 41 for the second magnetometric sensor 19 with middle point $A_2$. After a complete scan cycle for the working space under angle $\alpha$ the signal from memory unit 12 is sent to the input "c" of the control unit 14, which subsequently provides for the transmission of the values to be obtained of the functions $\sin \beta$ and $\cos \beta$ from the memory units 10 and 13 to the register 7 and the pulse generator 6 via the output "e".

Everything is repeated for the following value of angle $\beta$ to be obtained. The above-described procedure is repeated until all values of $\beta$ have been tried out. When the variable $\beta$-cycle is completed, the memory unit 13 sends a signal to the control unit 14 through the input "b". This signal completes the scanning of the working surface by means of the rotating electromagnetic field.

Consequently, the register 34 will register the code for the maximum value of the length of the radius vector R, whereas the registers 36 and 40 will register the values of the angles $\beta_1$ and $\alpha_1$ respectively for the first magnetometric sensor 18, and the registers 35, 37 and 41 the analogous values for the sensor 19.

These data are used to calculate the Cartesian coordinates $x_1, y_1, z_1$ and $x_2, y_2, z_2$ for the middle points $A_1$ and $A_2$ of the magnetometric sensors, which is a routine job according to the above-mentioned equations (4) which is usually carried out by a computer. The only thing that needs to be paid attention to is the conversion of the conditional digital code for the amplitudes of the radius vectors, which are calculated for the middle points $A_1$ and $A_2$ of the magnetometric sensors, into their metric form.

Figure 3:
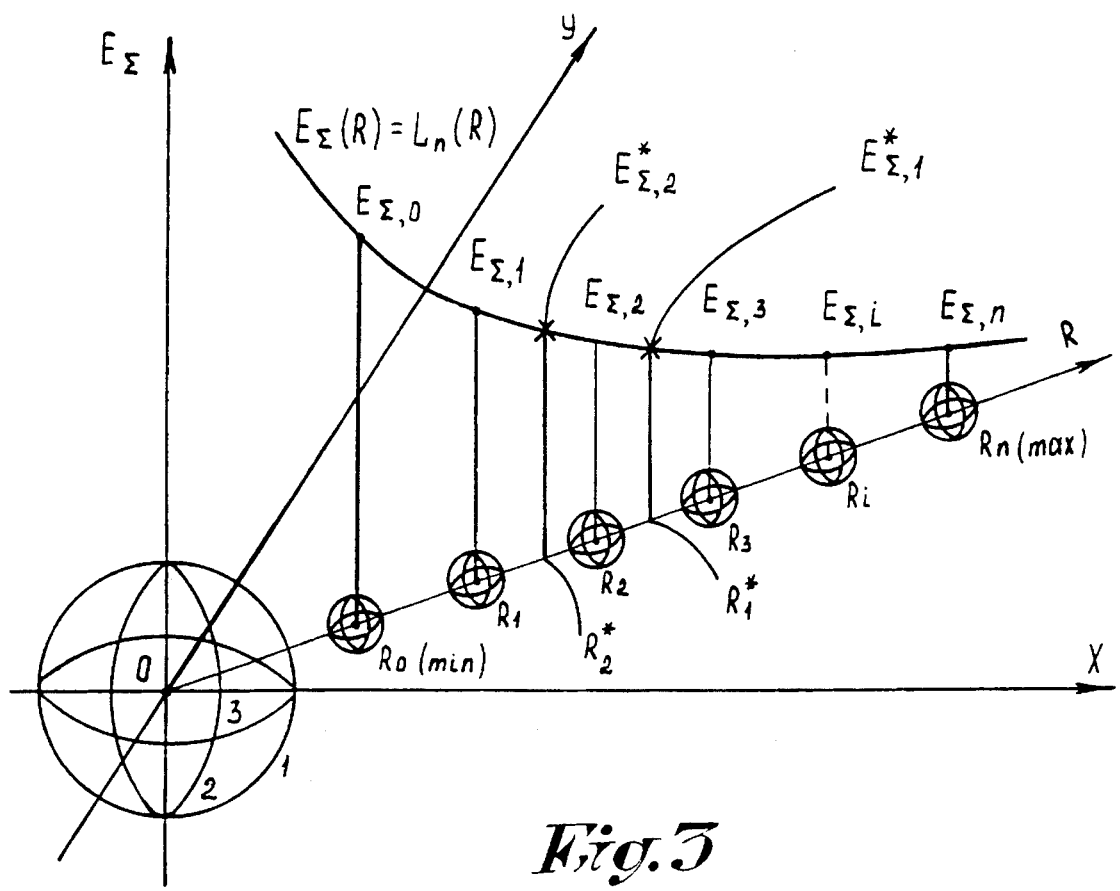
FIG. 3 shows a diagram with the relation between the amplitude of the generalized information signal and the distance.

FIG. 3 shows a diagram which represents the relation between the amplitude of the magnetometric sensor and the distance (R) to the beginning of the coordinate system. Such a relation can be easily determined in an inductive manner (it is much more difficult to solve it in analytical manner), making use of the values $E_{93,i}$ at points $R_i$ of the magnetometric sensor while it moves linearly (see FIG. 3). Taking into account the aforesaid (i.e. the three-dimensional invariability as far as the system for the generation of the magnetic field is concerned, together with the receiver induction system of the magnetometric sensor), the direction of the linear movement may differ within the boundaries of the working space, but it is easier to situate everything in a plane. The data regarding $E_{\Sigma,i}$ obtained through induction are stored in the computer.

When the device receives codes of the amplitudes $E^*_\Sigma$ of the generalized information signals (registers 34 and 35 are used), the computer starts to work out the algorithm for their conversion into the metric system for the distances $R_l$ and $R_2$. In order to apply this value $E_{\Sigma,i}$ obtained through induction, the polynomial $L_n(R)$ is formed by making use of for example Newton's formula for equal intervals and forward interpolation. By means of successive comparisons of all values for the sensor amplitudes $E^*_\Sigma$, registered in registers 34, 35 with sequentially calculated values for $L_n(R_i)$ for the $L_n(R)$ polynomial between $[R_{max}$ and $R_{min}]$ the corresponding values for the radius vector R for the middle point of each sensor are defined.

In order to increase the speed of the working method and to simplify the method for the creation of vector components for the magnetic field by means of the coordinate axis (see equation (1)), it is better to let the rotation of the above-mentioned field alternately take place in the horizontal and the vertical planes. In this case the equation (1), which is used for the three-dimensional rotation of the magnetic field, is replaced by two equations, namely the equation (5):

$$\overline{B}_x = B \cos \alpha$$

$$\overline{B}_y = B \sin \alpha$$

which describe the rotation of the field in the XOY plane and the equation $$\overline{B}_z = B \cos \beta$$

$$\overline{B}_y = B \sin \beta$$

which is used to describe the field rotation in the YOZ plane. The realization of individual rotations in each of the planes will of course require m times less information, whereby m=the number of levels for the digitization of the rotation angle.

Figure 5:
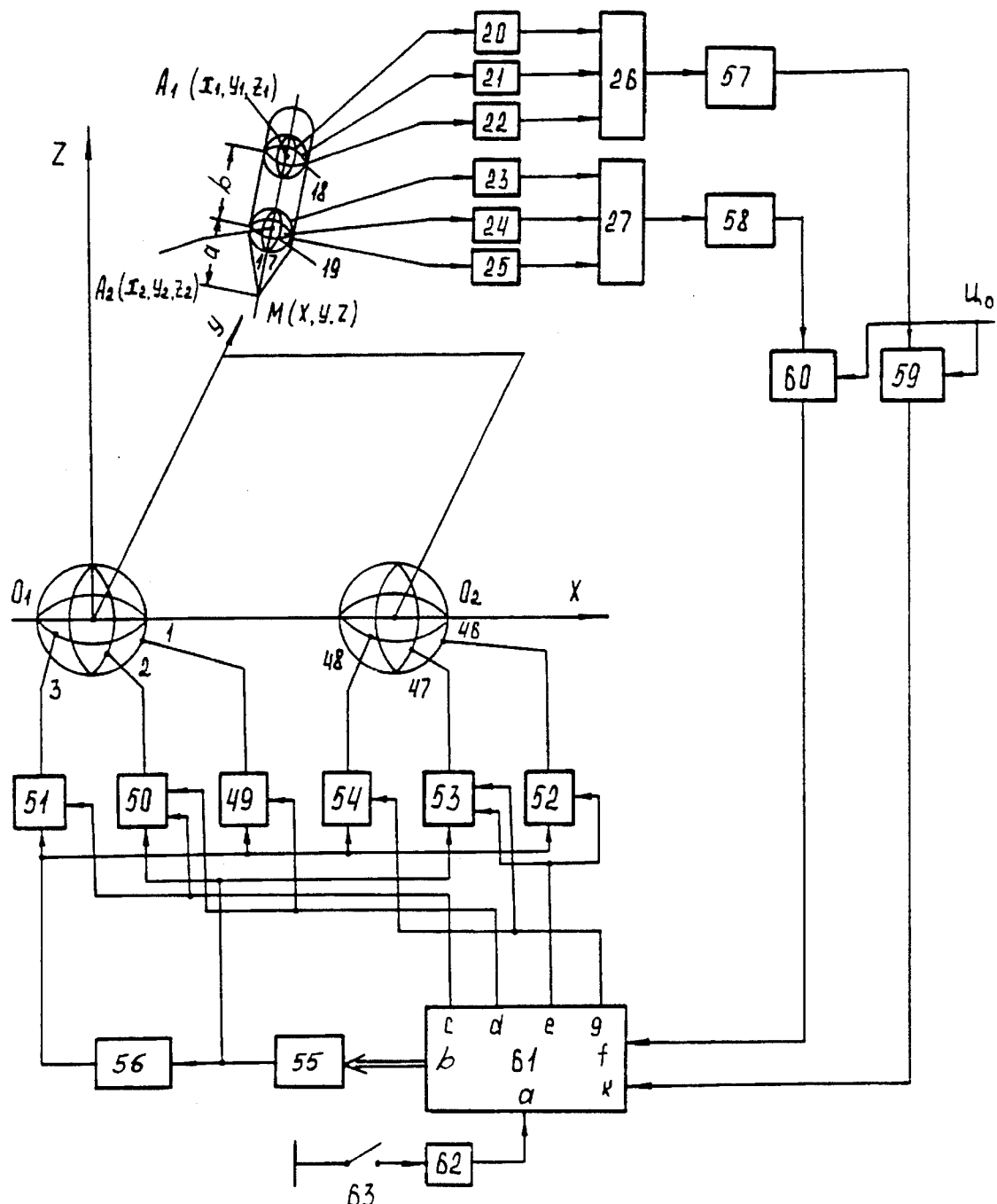
FIG. 5 is a schematic representation of a second embodiment of a device for reading three-dimensional information according to the invention.

In order to increase the accuracy, it is hence suggested in a second embodiment to scan the working space by rotating the magnetic field at two points on either of the coordinate axes (for example the OX axis) and which are situated at a certain distance d from one another (FIG. 5). Thus, it is no longer required to convert the amplitude of the generalized information signal of the magnetometric sensors to their metric equivalents for the distances $R_l$ and $R_2$. Since the value $E_\Sigma$ is subject to arbitrary fluctuations, the accuracy of this working method can be significantly improved by excluding said operation, making use of the fixed standard value d for the calculation.

If the components of the magnetic field change along the coordinate axes OX and OY in correspondence with the equation (5), and the angle $\alpha$ changes in the area $0 \leq \alpha \leq 2\pi$ in each point of the surrounding space, a magnetic field is created whose magnetic induction vector turns around the driving point in the plane XOY, whereby the length $|\overline{B}|$ is kept constant for the points of rotation which are situated at an equal distance from the middle point of the space. A number of these points form a circle, as a result of the sphere section with radius R, as shown in FIG. 1, by means of planes which are parallel to the plane XOY. If the equation (5) is applied for the magnetic induction vector lengths, defined by the distance R, this results in the equation $$|\overline{B}| = \sqrt{B_x^2 + B_y^2} = \sqrt{B^2\cos^2\alpha + B^2\sin^2\alpha} = B$$

which confirms the preceding theorem.

The same applies to the rotation of the magnetic field in the vertical YOZ plane. In this case the value of the angle $\beta$ is fixed.

Thus, the main difference with the first embodiment of the method concerns the use of the magnetic induction vector $\overline{B}$ which alternately turns in the selected XOY and XOZ planes. In this case it is possible to define the angle intersections $\alpha_1^{(1)}, \beta_1^{(1)},$ and $\alpha_2^{(1)}, \beta_2^{(1)}$, for the middle point of the first magnetometric sensor by making use of both field rotation points, and to define the angle intersections $\alpha_1^{(2)}, \beta_1^{(2)}, \alpha_2^{(2)}, \beta_2^{(2)}$, for the middle point of the second sensor by making use of the same rotation points. If the distance d between two field rotation points is known, these data are sufficient to define the Cartesian coordinates for the middle points $A_1$ and $A_2$ of the two magnetometric sensors 18 and 19.

As is shown in FIG. 4, when solving the right-angled triangles $O_1CE$ and $O_2CE$ for the coordinate x of point A (the middle point of the reading device), the result is:

$$x_k = d \frac{\tan g \cdot \alpha_2^{(k)}}{\tan g \cdot \alpha_1^{(k)} + \tan g \cdot \alpha_2^{(k)}}$$

Since the coordinate $x=O_1$ is known here from the solution of the triangle $O_1CE$, the result for the coordinate $y=CE$ is:

$$y_k = d \frac{\tan g \cdot \alpha_2^{(k)} \tan g \cdot \alpha_2^{(k)}}{\tan g \cdot \alpha_1^{(k)} + \tan g \cdot \alpha_2^{(k)}}$$

And when solving the triangles $O_1CE$ and $O_1AC$ for the coordinate $z=AC$, the result is:

$$z_k = d \frac{\tan g \cdot \alpha_2^{(k)} \cdot \cos \alpha_2^{(k)} \cdot \cot g \cdot \beta_1^{(k)}}{\tan g \cdot \alpha_1^{(k)} + \tan g \cdot \alpha_2^{(k)}}$$

FIG. 4 illustrates the geometric construction for a specific point which is used for receiving induction signals (this point belongs to the middle point of one of the magnetometric sensors). Naturally, a similar conclusion can also be made for the middle point of the second sensor. The coordinates for the peak point of the coordinate reading device, superposed on the point which is read on the three-dimensional object, are, as in the preceding case, read according to the equation (4).

The values of the angles $\alpha$ and $\beta$ whereby the constantly changing amplitude $E_\Sigma$ of the generalized information signal of the magnetometric sensors has reached its maximum value, are defined by the differentiation of the signals $E_\Sigma$ depending on the corresponding angle. It is known that the first derived value zero corresponds to the extreme function value (this concerns both $E_\Sigma(\alpha)$ as $E\Sigma(\beta)$). When the flow values of $$\frac{\partial E_\Sigma(\alpha)}{\partial \alpha} \text{ and } \frac{\partial E_\Sigma(\beta)}{\partial \beta} \text{ are}$$

compared to the values of the limiting value $U_0=0$, the moment at which the angles $\alpha$ and $\beta$ are equal can be fixed.

FIG. 5 is a schematic representation of the device for the application of the second embodiment of the method. The rotating electromagnetic field appears at two points $0_1$ and $0_2$, which are situated on the OX axis at the known mutual distance d from one another, and the field is formed by two systems of three bi-orthogonal identical induction coils 1, 2, 3 and 46, 47, 48. The field is alternately rotated at the points $0_1$ and $0_2$ and alternately in each of the selected XOZ and YOZ planes. The coils 1, 2 and 3 and 46, 47 and 48, which generate the electromagnetic field, are oriented in accordance with the coordinate planes XOZ, YOZ and XOY according to the Cartesian coordinate system. The inputs of the coils are connected to the current gates 49, 50 and 51 and 52, 53 and 54. The current inputs of the gates 50 and 53 are connected to the sinusoidal current generator 55, and the current inputs of the gates 49, 51 and 52, 54 are connected to the output of the phase shifter 56, connected to the generator 55.

The device includes the coordinate reading device 17, with two magnetometric sensors 18 and 19, whose receiver coils are connected to the amplifiers of the square root type 20, 21, 22 and 23, 24 and 25 respectively. The outputs of the amplifiers 20, 21 and 22 are connected to the analog accumulator 26 and those of the amplifiers 23, 24, 25 with the analog accumulator 27. These accumulators 26 and 27 are connected to the differentiating connections 57 and 58 respectively. The outputs of these connections 57 and 58 are connected to the inputs of the corresponding comparators 59 and 60 respectively, whose second input receives the threshold value $U_0=0$.

Further, the device comprises the control unit 61, whose input "a" is connected to the current pulse generator 62, connected to the start button 63. The control unit 61 is an ordinary, discrete circuitry which can be easily built up; that is why no detailed description of its structure is given. What is important, however, is that this circuitry must contain the memory unit in which the function values sin $\alpha$ and sin $\beta$ are stored according to the required increment $\Delta\alpha$, $\Delta\beta$ of the angle of rotation, together with the values of the counters which are used for the formation of the angles $\alpha(\beta)= i\Delta\alpha(\Delta\beta)$. The control unit 61 is connected to the sinusoidal current generator 55 via its output "b", and via its output "c" to the control input gates 50 and 51, via its output "e" with the input of the gates 52 and 53; the output "g" is connected to the input of the gates 53 and 54, and the control inputs "f" and "k" to the comparators 60 and 59 respectively.

The device works as follows. When the peak point of the coordinate reading device 17 is placed at the point M to be read, with the unknown coordinates x, y, z, the operator closes the loop by pushing the start button 63, as a result of which the pulse generator 62 is activated, which in turn activates the control unit 61. Via its output "d" the latter opens the current gates 49 and 50, and through the outlet of its output "b" the sinusoidal current generator 55 sends a series of digital values for the sine function, with an angle increment. At the output side of the generator 55, the constant sinusoidal signal is formed and brought in the phase shifter 56 where said signal is converted in a sinusoidal form. Simultaneously, signals coming from the generator 55 and the phase shifter 56 go through the current gates 50 and 49, which were opened by the outlet of the output "d", and the coils 1 and 2 are enforced by the first phase shifter (in point $0_1$) to cause the rotation of the magnetic field in the XOY plane.

In the points $A_1$ and $A_2$ used to receive the induction signal, and where the middle points $A_1$ and $A_2$ of the magnetometric sensors 18 and 19 are situated, the magnetic fields are generated, which induce the corresponding signals 1 in the induction coils which are amplified by the amplifiers 20, 21, 22 and 23, 24, 25 with the square root qualities. Said signals are collected in the analog accumulators 26, 27 and differentiated according to the angle in the differential connection 57, 58. The differentiated signals are received in the corresponding comparators 59, 60 where they are compared to the threshold value 0. When the amplitudes of said signals are compared, the comparators 59, 60 send the control signals for each of the sensors to the inputs "k" and "f" respectively of the control unit 61 which register the angles $\alpha=i\Delta\alpha$ for each of the sensors with these signals, including the maximum amplitude value of the generalized information signal.

In the same manner, the control unit 61 emits the control signals from its outputs "c", "e" and "g", and by making use of the outlet of its output "b" to transmit the sin function values of the generator 55, the angle intersections $\beta_1^{(1)}$, $\beta_1^{(2)}$, $\alpha_2^{(1)}$, $\alpha_2^{(2)}$, $\beta_2^{(1)}$, $\beta_2^{(t)}$ are formed, required for the calculation of the Cartesian coordinates $x_1$, $y_1$, $z_1$ and $x_2$, $y_2$, and $z_2$ for the points which receive the induced signal (points which belong to the middle points $A_1$ and $A_2$ of the magnetometric sensors 18 and 19, and which are used to define the coordinates x, y, z of the point M which is read off from the three-dimensional object, according to the above-mentioned equations (4). All routine calculations are preferably made by means of a microcomputer or minicomputer. This method is advantageous in that there is not any mechanical digitization of the working space as for the working of the components and in that the amplitudes of the induced signals are immediately converted into their metric equivalents. The accuracy with which the coordinates are measured solely depends on the sensitivity of the comparators used, and whose resolution capacity is much higher than anything that can be realized with mechanical digitization and with the conversion from analogous to digital values.

The present invention is by no means limited to the embodiments described above; on the contrary, the embodiments can be made in all sorts of variants while still remaining within the scope of the invention, as defined in the claims.

We claim:

1. A method for reading three-dimensional information, comprising the steps of:

generating a variable magnetic field in a coordinate system of a working space;

placing first and second magnetometric sensors coaxially in a coordinate reading device;

forming by means of the magnetometric sensors a generalized information signal $E_\Sigma = e_1^2 + e_2^3 + e_3^2$, where $e_1$ (i=1, 2, 3) is the amplitude of signals induced in three bi-orthogonal receiver induction coils in each of the magnetometric sensors; and determining coordinates of a specific point on the coordinate reading device superposed by an operator on a point u to be measured, the specific point being hereinafter referred to as a "peak point," according to the equation $u = u_2 - a/b\,(u_1 - u_2)$, where $u_1 = \{x_1, y_1, z_1,\}$ and $u_2 = \{x_2, y_2, z_2\}$ are the coordinates of a point defined within a respective sensor defined in relation to the three bi-orthogonal coils which make up each respective sensor, the defined points of the respective sensors being referred to hereinafter as sensor "middle points," a is a distance from the peak point of the coordinate reading device to the middle point of a magnetometric sensor nearest the coordinate reading device, and b is a distance between the middle points of the first and second magnetometric sensors, and further comprising the steps of:

rotating a magnetic induction vector of the generated magnetic field around a zero point of the coordinate system in the working space;

registering in horizontal and vertical planes, respectively, maximum amplitude values $E_{\Sigma MAX}$ of the generalized information signal of the first and second magnetometric sensors and corresponding maximum turning angles $\alpha_1$, $\beta_1$, and $\alpha_2$, $\beta_2$ of magnetic induction vectors of the field;

determining the coordinates of the middle points of each of the magnetometric sensors according to the following equations:

x=R cos α sin β, y=R sin α sin β, z=R cos β, where $R = f(E_{\Sigma MAX})$ has a predefined value; and on the basis of the results of the middle point coordinate determination, identifying coordinates of the peak point of the coordinate reading device.

2. A method for reading three-dimensional information, comprising the steps of:

generating a variable magnetic field in a Cartesian coordinate system;

placing first and second magnetometric sensors coaxially in a device for reading coordinates;

forming by means of the magnetometric sensors a generalized information signal $E_\Sigma = e_1^2 + e_2^3 + e_3^2$, where $e_1$ (i=1, 2, 3) is the amplitude of signals induced in three bi-orthogonal receiver induction coils in each of the magnetometric sensors; and determining coordinates of a specific point on the device for reading coordinates superposed by an operator on a point u to be measured, the specific point being hereinafter referred to as a "peak point," according to the equation $u = u_2 - a/b\,(u_1 - u_2)$, where $u_1 = \{x, y_1, z_1,\}$ and $u_2 = \{x_2, y_2, z_2\}$ are the coordinates of a point defined by its position relative to the three bi-orthogonal coils which made up each respective sensor, the defined point being referred to hereinafter as a sensor "middle point," a is a distance from the peak point of the device for reading coordinates to the middle point of a magnetometric sensor nearest the device for reading coordinates, and b is a distance between the middle points of the first and second magnetometric sensors, and further comprising the steps of:

successively rotating a magnetic induction vector of the generated field about two points situated at a fixed mutual distance d on one of the coordinate axes of the Cartesian coordinate system, in the horizontal and vertical planes;

differentiating the generalized information signal of each magnetometric sensor for each of the two rotation points and for the horizontal and vertical planes according to the turning angle;

when amplitudes of the differentiated signals equal zero, registering the corresponding angles $\alpha_1^{(1)}$, $\alpha_2^{(1)}$ and $\beta_1^{(1)}$, $\alpha_1^{(2)}$, $\alpha_2^{(2)}$ and $\beta_1^{(2)}$, $\beta_2^{(2)}$ which characterize the rotation of the magnetic induction vector of the field;

defining Cartesian coordinates $x_k$, $y_k$, and $z_k$ (k=1, 2, 3) for the middle points of the magnetometric sensors according to the following equations:

$$x_k = d \frac{\tang \cdot \alpha_2^{(k)}}{\tang \cdot \alpha_1^{(k)} + \tang \cdot \alpha_2^{(k)}},$$

$$y_k = d \frac{\tang \cdot \alpha_2^{(k)} \tang \cdot \alpha_2^{(k)}}{\tang \cdot \alpha_1^{(k)} + \tang \cdot \alpha_2^{(k)}}, \text{ and}$$

$$z_k = d \frac{\tang \cdot \alpha_2^{(k)} \cdot \cos\alpha_2^{(k)} \cdot \cotg \cdot \beta_1^{(k)}}{\tang \cdot \alpha_1^{(k)} + \tang \cdot \alpha_2^{(k)}};$$

determining, on the basis of a result of said equations, the coordinates of the peak point of the device for reading coordinates.

3. A device for reading three-dimensional information, comprising:

means for generating a variable magnetic field in a Cartesian coordinate system;

a reading device which includes first and second coaxially placed magnetometric sensors, each sensor comprising three bi-orthogonal receiver induction coils and a point specified therein which is hereinafter referred to as a peak point, said peak point being superposed on a point having unknown coordinates, said coordinates being determined on the basis of a generalized information signal $E_\Sigma = e_1^2 + e_2^3 30\ e_3^2$, where $e_1$ (i=1, 2, 3) is the amplitude of signals induced in the three bi-orthogonal receiver induction coils in each of the magnetometric sensors;

means connected to said sensors for inputting signals representative of magnetic induction vectors of the generated magnetic field and for rotating said vectors around a zero point of the coordinate system;

means connected to said sensors and said vector rotating means for registering a maximum value of an amplitude of the generalized information signal of the sensors and corresponding maximum turning angles of the magnetic induction vectors in respective horizontal and vertical planes; and means connected to the sensors and registering means for determining the coordinates of points in the sensors defined in relation to the coils for determining coordinates of the reading device on the basis thereof.

4. A device for reading three-dimensional information, comprising:

means for generating a variable magnetic field in a Cartesian coordinate system of a working space;

a reading device which includes first and second coaxially placed magnetometric sensors, each sensor comprising three bi-orthogonal receiver induction coils and a point specified therein which is hereinafter referred to as a peak point, said peak point being superposed on a point having unknown coordinates, said coordinates being determined on the basis of a generalized information signal $E^\Sigma = e_1^2 + e_2^3 + e_3^2$, where $e_1$ (i=1, 2, 3) is the amplitude of signals induced in the three bi-orthogonal receiver induction coils in each of the magnetometric sensors;

means for inputting signals representative of magnetic induction vectors of the generated variable magnetic field and for successively rotating a magnetic induction vector of the generated field about two points situated at a fixed mutual distance d on one of the coordinate axes of the Cartesian coordinate system, in the horizontal and vertical planes;

means connected to the sensors and the induction vector rotating means for differentiating the generalized information signal of each magnetometric sensor for each of the two rotation points and for the horizontal and vertical planes according to the turning angle;

means connected to the differentiating means for determining when amplitudes of the differentiated signals equal zero, and for registering the corresponding angles $\alpha_1^{(1)}$, $\alpha_2^{(1)}$ and $\beta_1^{(1)}$, $\beta_2^{(1)}$; $\alpha_1^{(2)}$, $\alpha_2^{(2)}$ and $\beta_1^{(2)}$, $\beta_2^{(2)}$ which characterize the rotation of the magnetic induction vector of the field; and means for defining Cartesian coordinates $x_k$, $y_k$, and $z_k$ (k=1, 2, 3) for the middle points of the magnetometric sensors and for further determining on the basis of said middle point coordinate determination, the coordinates of the peak point of the reading device.

* * * * *